Dec. 23, 1941.   C. F. DEZENDORF   2,267,085
KNOCK ELIMINATOR
Filed April 23, 1941

Inventor
CHARLES F. DEZENDORF
By Clarence A. O'Brien
Attorney

Patented Dec. 23, 1941

2,267,085

UNITED STATES PATENT OFFICE 2,267,085

KNOCK ELIMINATOR

Charles F. Dezendorf, East Williston, N. Y.

Application April 23, 1941, Serial No. 390,009

1 Claim. (Cl. 285—90)

This invention relates to a sound deadener or knock eliminator for water or other fluid meters which when in operation create a knocking sound that may be heard for a considerable distance from the meter and throughout a building in which the meter is located due to the fluid pipes connected to said meter and extending to various places in the building conducting the annoying sounds and noises created by said meter. The primary object of this invention is the provision of sound deadening devices of the above stated character acting as fluid couplers between the pipes and the meter so that disturbing noises created in the meter will not reach the pipes, consequently localizing the noises at the meter.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation illustrating a sound deadening device constructed in accordance with my invention.

Figure 1:
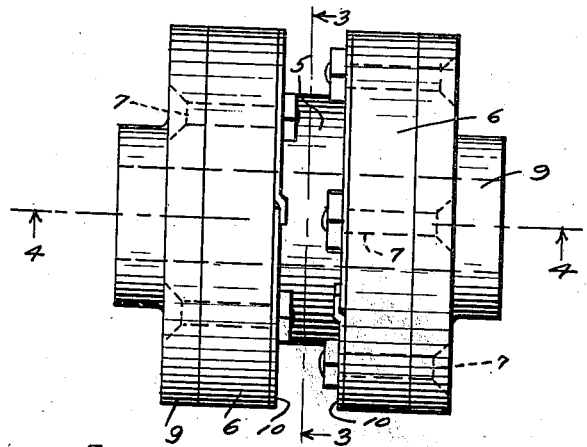
Figure 2:
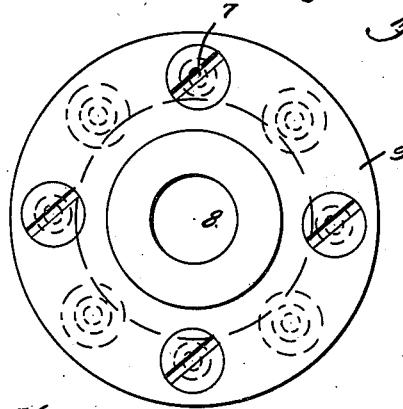
Figure 2 is an end elevation illustrating the device.
Figure 3:
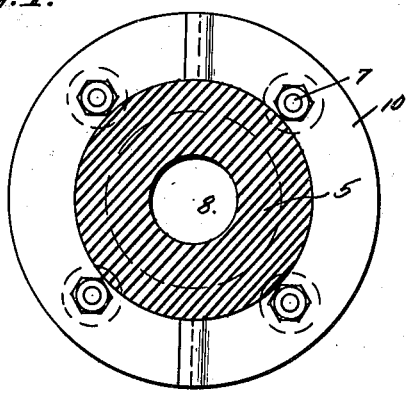
Figure 3 is a transverse sectional view taken on the line 3—3 of Figure 1.
Figure 4:
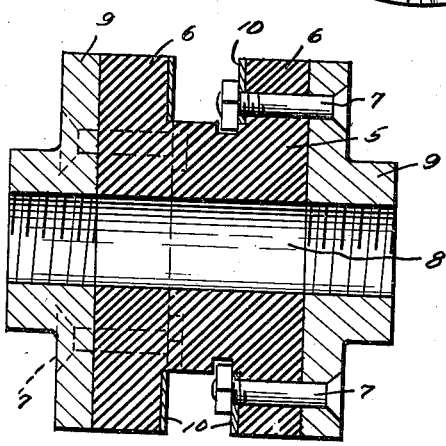
Figure 4 is a sectional view taken on the line 4—4 of Figure 1.

Referring in detail to the drawing, the numeral 5 indicates a cylindrical body constructed of sound deadening material, such as rubber, and has integral therewith end annular flanges 6 provided with openings to receive fasteners or bolts 7. A bore 8 extends from end to end of the body through which fluid may readily flow and the walls of the bore may have fabric reinforcements thereto to prevent expansion of the body under excessive pressure if desired.

Flanged type coupling plates 9 abut the flanges 6 of the body and have openings to receive the fasteners 7. It is preferable that the heads of the fasteners 7 be countersunk in the coupling plates.

The bores of the coupling plates 9 are provided with screw threads to permit said coupling plates to be readily threaded onto nipples and pipes.

Owing to the material from which the flanges 6 are constructed and to prevent the fasteners 7 from cutting therein, washers 10 are provided and apertured to receive the fasteners 7 preventing the nuts thereof from biting into said flanges 6.

In use, it is proposed to adapt one of the devices above described and shown in the drawing to each pipe connected with a fluid meter so that the flow of fluid can be had between the meter and the pipe as usual. However, any noises or sounds created in the meter will be absorbed by the body 5 and prevented from being transmitted to the pipe.

While I have shown and described the preferred embodiment of my invention, it will be understood that minor changes in construction, combination and arrangement of parts may be made without departing from the spirit and scope of the invention as claimed.

Having thus described my invention, what I claim is:

A sound deadening device for use in the line of connection to or from a water meter comprising a spool-like member of rubber composition having a pair of radial circumferential end flanges and a through axial bore, a pair of pipe couplings having end flanges opposed to the outer faces of said pair of flanges, respectively, and provided with threaded bores for coupling in said line, bolts extending through the opposed flanges, and annular metallic flat washers opposed to the inner faces of said pair of flanges and secured thereto by said bolts to prevent deformation of said pair of flanges.

CHARLES F. DEZENDORF.